US 8,249,830 B2

(12) United States Patent
Minhas et al.

(10) Patent No.: US 8,249,830 B2
(45) Date of Patent: Aug. 21, 2012

(54) METHOD AND SYSTEM FOR AUTOMATICALLY DIAGNOSING FAULTS IN RENDERING DEVICES

(75) Inventors: Rajinderjeet Singh Minhas, Churchville, NY (US); Vishal Monga, Torrance, CA (US); Wencheng Wu, Webster, NY (US); Divyanshu Vats, Minneapolis, MN (US)

(73) Assignee: Xerox Corporation, Norwalk, CT (US)

( * ) Notice: Subject to any disclaimer, the term of this patent is extended or adjusted under 35 U.S.C. 154(b) by 389 days.

(21) Appl. No.: 12/487,803

(22) Filed: Jun. 19, 2009

(65) Prior Publication Data
US 2010/0325487 A1  Dec. 23, 2010

(51) Int. Cl.
*G21C 17/00* (2006.01)
*G06F 11/30* (2006.01)

(52) U.S. Cl. .......... 702/185; 702/181; 702/183; 702/81; 702/179; 702/184; 700/174; 324/500; 355/18; 355/78; 358/3.26

(58) Field of Classification Search .......... 702/185
See application file for complete search history.

(56) References Cited

U.S. PATENT DOCUMENTS

| | | | | |
|---|---|---|---|---|
| 5,544,256 A | * | 8/1996 | Brecher et al. | 382/149 |
| 5,600,574 A | * | 2/1997 | Reitan | 702/185 |
| 6,996,549 B2 | * | 2/2006 | Zhang et al. | 706/16 |
| 2002/0141769 A1 | * | 10/2002 | Phillips | 399/38 |
| 2003/0142985 A1 | | 7/2003 | Sampath et al. | 399/9 |
| 2006/0158703 A1 | * | 7/2006 | Kisilev et al. | 358/504 |
| 2007/0143038 A1 | * | 6/2007 | Yuan et al. | 702/35 |
| 2008/0059856 A1 | * | 3/2008 | Lee et al. | 714/728 |
| 2008/0126860 A1 | | 5/2008 | Sampath et al. | 714/25 |
| 2008/0312906 A1 | * | 12/2008 | Balchandran et al. | 704/9 |

FOREIGN PATENT DOCUMENTS
WO   WO 2009090584 A2 *  7/2009

OTHER PUBLICATIONS

Vats, Divyanshu (as told by Applicant's Representative Kermit Lopez) et al. Algorithm for Automatic Discover of New Printer Faults, (Date and Publisher currently unavailable).*
Definition of Entropy, Wolfram Math World, http://mathworld.wolfram.com/Entropy.html, last accessed (Jan. 30, 2012).*
Definition of Relative Entropy, Wolfram Math World, http://mathworld.wolfram.com/RelativeEntropy.html, (last accessed (Jan. 30, 2012).*
Burges, Christopher J.C., A Tutorial on Support Vector Machines for Pattern Recognition; Data Mining and Knowledge Discovery 2, 121-167 (1998).

* cited by examiner

*Primary Examiner* — Cindy H Khuu
*Assistant Examiner* — Timothy H Hwang
(74) *Attorney, Agent, or Firm* — Luis M. Ortiz; Kermit D. Lopez; Melissa Asfahani

(57) ABSTRACT

A method and system for automatically determining an optimal re-training interval for a fault diagnoser based on online monitoring of the performance of a classifier are disclosed. The classifier generates a soft measure of membership in association with a class based on a training data. The output of the classifier can be utilized to assign a label to new data and then the members associated with each class can be clustered into one or more core members and potential outliers. A statistical measure can be utilized to determine if the distribution of the outliers is sufficiently different than the core members after enough outliers have been accumulated. If the outliers are different with respect to the core members, then the diagnoser can be re-trained; otherwise, the output of the classifier can be fed to the fault diagnoser.

20 Claims, 6 Drawing Sheets

METHOD AND SYSTEM FOR AUTOMATICALLY DIAGNOSING FAULTS IN RENDERING DEVICES

TECHNICAL FIELD

Embodiments are generally related to rendering devices such as printers, scanners, multi-function devices, photocopy machines, and the like. Embodiments are also related to fault diagnostic systems. Embodiments are additionally related to methods for diagnosing faults in rendering devices.

BACKGROUND OF THE INVENTION

Fault detection and diagnosis are an important aspect of condition-based maintenance systems, which collect the signatures of operable machines utilizing multiple sensors for subsequent analysis. Rendering devices such as printers, for example, may include defects that are detected after a product has been launched. Image quality related faults, for example, are a major contributor to post sale service run costs and therefore a need exists to quickly initiate repair actions with respect to such faults.

The majority of prior art diagnostic approaches permit the rendering device to request service automatically when the sensors detect particular operating parameters outside permissible ranges. One problem with such diagnostic techniques is that they are static and incapable of adapting to changes associated with the rendering characteristics. Also, such techniques do not respond to the various number of image quality related faults that are often detected by service engineers after a product is launched. Such diagnostic method and systems do not provide for any formal mechanism that determines when to re-train an underlying diagnoser and thus can lead to customer dissatisfaction. Hence, it is important to incorporate new knowledge and update the diagnosers as new defects are discovered. Additionally, training a new classifier entails time and effort, so performing unnecessary training is uneconomical, whereas a lack of training in the presence of new faults will reduce the efficacy and accuracy of the classifier.

Based on the foregoing, it is believed that a need exists for an improved method and system for updating a fault diagnoser based on online monitoring of the performance of a classifier. A need also exists for an improved method for automatically diagnosing new rendering device faults, as described in greater detail herein.

BRIEF SUMMARY

The following summary is provided to facilitate an understanding of some of the innovative features unique to the present invention and is not intended to be a full description. A full appreciation of the various aspects of the embodiments disclosed herein can be gained by taking the entire specification, claims, drawings, and abstract as a whole.

It is, therefore, one aspect of the present invention to provide for an improved method and system for configuring rendering devices such as printers, scanners, multi-function devices, photocopy machines, and the like.

It is another aspect of the present invention to provide for an improved method for updating a fault diagnoser based on online monitoring of the performance of a classifier.

It is a further aspect of the present invention to provide for an improved method, system, and computer-usable medium for automatically determining an optimal re-training interval for the diagnoser.

It is yet another aspect of the present invention to provide for an improved automated diagnostic system for automatically diagnosing new rendering device faults.

The aforementioned aspects and other objectives and advantages can now be achieved as described herein. A method and system for automatically determining an optimal re-training interval for a fault diagnoser based on online monitoring of the performance of a classifier is disclosed. The classifier (e.g., a support vector machine) generates a soft measure of membership in association with a class based on a training data. The output of the classifier can be utilized to assign a label to new data and then the members associated with each class can be clustered into one or more core members and potential outliers. A statistical measure (e.g., Kullback-Liebler) can be utilized to decide if the distribution of the outliers is sufficiently different than that of the core members after enough outliers have been accumulated. If the outliers are different with respect to the core members then the diagnoser can be re-trained, otherwise the output of the classifier can be fed to the fault diagnoser.

A known test pattern can be rendered and scanned to extract a raw image for an image quality diagnosis which in turn can be fed to the classifier. The defects associated with the rendering device that cause image quality artifacts can be manifested in the raw image. The raw image can then be fed to the classifier which provides a list of defects (symptoms) to the diagnoser. Additionally, a flag can be set if the classifier detects sufficient statistical evidence for the existence of a new defect and the diagnoser can be re-trained. Images associated with known symptoms (e.g., banding, streaks, spots, etc.) can be utilized to train the classifier.

The classifier functions as a universal approximator to mimic any bounded continuous function with arbitrary precision and provides the soft measure of membership. The classifier ensures good classification in a wide variety of scenarios and is useful for determining the level of confidence in the output of the classifier. The points most unlikely to belong to the class can be termed as outliers while the rest can be considered as the core members of the class. The proposed approach develops a formal mechanism that can automatically determine when to re-train the fault diagnoser and enables the classifier to handle the new defects which can emerge over time. The algorithmic components of such mechanism can be detected in a system by synthesizing training data that yields known classification results. Similarly, training data from synthetic new classes can be generated in order to provide identifiable results.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

Figure 1:
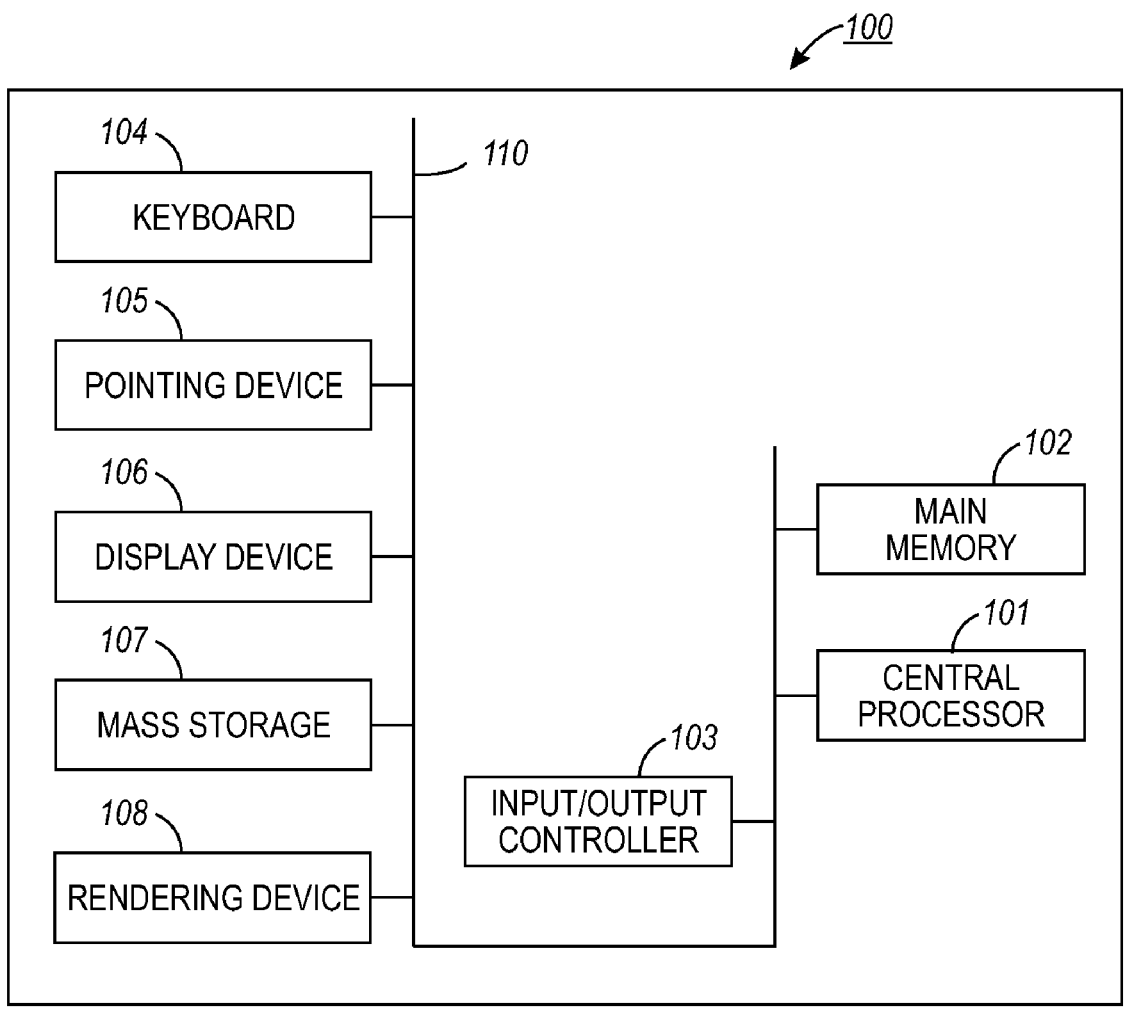
FIG. 1 illustrates a schematic view of a computer system in which the present invention may be embodied.

As depicted in FIG. 1, the present invention may be embodied in the context of a data-processing apparatus 100 comprising a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a rendering device 108, may be included in the data-processing apparatus 100 as desired. The rendering device 108 may be a standalone single function device such as a dedicated printer, scanner, copy machine, etc. Preferably, rendering device 108 may function as a MFD (Multifunction Device) capable of multiple rendering functions such as printing, copying, scanning, faxing, etc. As illustrated, the various components of the data-processing apparatus 100 communicate through a system bus 110 or similar architecture.

Figure 2:
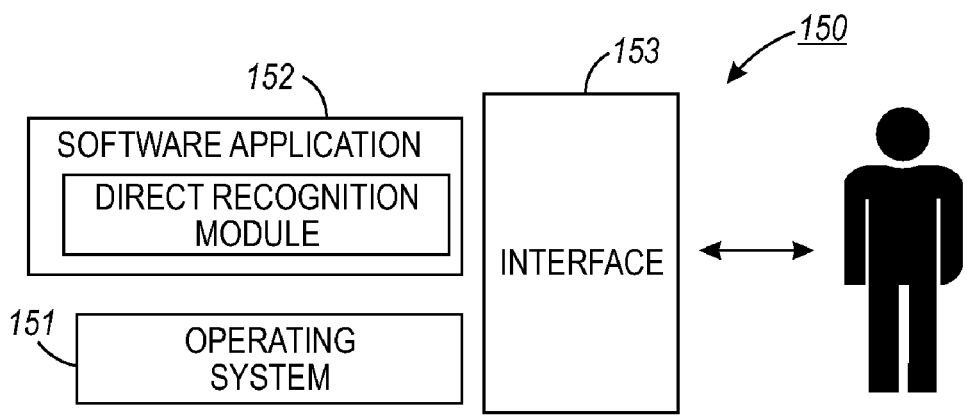
FIG. 2 illustrates a schematic view of a software system including an operating system, application software, and a user interface for carrying out the present invention.

FIG. 2 illustrates a computer software system 150 for directing the operation of the data-processing apparatus 100 depicted in FIG. 1. Software system 150, which is stored in system memory 102 and on disk memory 107, can include a kernel or operating system 151 and a shell or interface 153. One or more application programs, such as application software 152, may be "loaded" (i.e., transferred from storage 107 into memory 102) for execution by the data-processing apparatus 100. The data-processing apparatus 100 receives user commands and data through user interface 153; these inputs may then be acted upon by the data-processing apparatus 100 in accordance with instructions from operating module 151 and/or application module 152.

The interface 153, which is preferably a graphical user interface (GUI), also serves to display results, whereupon the user may supply additional inputs or terminate a given session. In one possible embodiment, operating system 151 and interface 153 can be implemented in the context of a "Windows" system. It can be appreciated, of course, that other types of systems are possible. For example, rather than a traditional "Windows" system, other operation systems such as, for example, Linux may also be employed with respect to operating system 151 and interface 153. Module 152 can be adapted for updating a fault diagnoser based on online monitoring of the performance of a classifier. Module 152 can be adapted for automatically determining an optimal re-training interval for a diagnoser. Application module 152, on the other hand, can include instructions such as the various operations described herein with respect to the various components and modules described herein such as, for example, the method 600 depicted in FIG. 6.

The following description is presented with respect to embodiments of the present invention, which can be embodied in the context of a data-processing system such as data-processing apparatus 100 and computer software system 150 depicted respectively FIGS. 1-2. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, LINUX, and the like. Therefore, the description of the exemplary embodiments, which follows, is for purposes of illustration and not considered a limitation.

Figure 3:
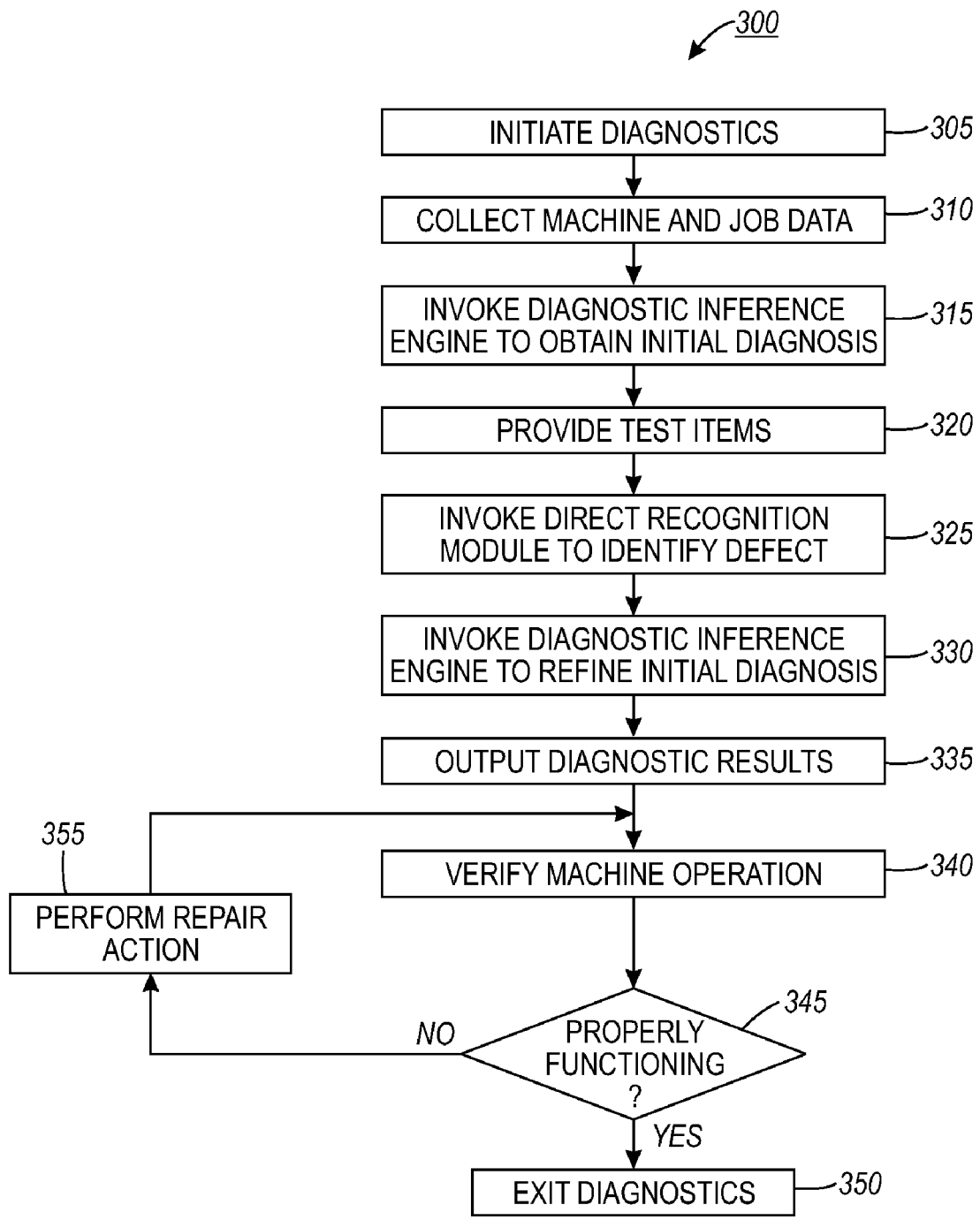
FIG. 3 illustrates a high level flow chart of operations illustrating logical operational steps of a method for automatically diagnosing new faults in a machine, in accordance with an embodiment.

FIG. 3 illustrates a high level flow chart of operations illustrating logical operational steps of a method 300 for automatically diagnosing new faults in a machine, in accordance with an embodiment. A fault is an abnormal state with respect to a machine, including dysfunction of a part, an assembly, or the whole system. The occurrence of the fault is associated with a number of factors, which in turn is related to a number of symptoms. Fault diagnostics is the study of the relationship of fault, factors and symptoms, and it is utilized to predict and control the performance of a system such as, for example, a telecommunication system, a xerographic system, and so forth. Automated fault diagnostic systems can be utilized for the automated diagnosis of machine failures. For example, when the rendering device 108 senses a problem, or when the operator is not satisfied with the machine performance, or when preventive maintenance is desired, the automated diagnostics system can be invoked.

Figure 5:
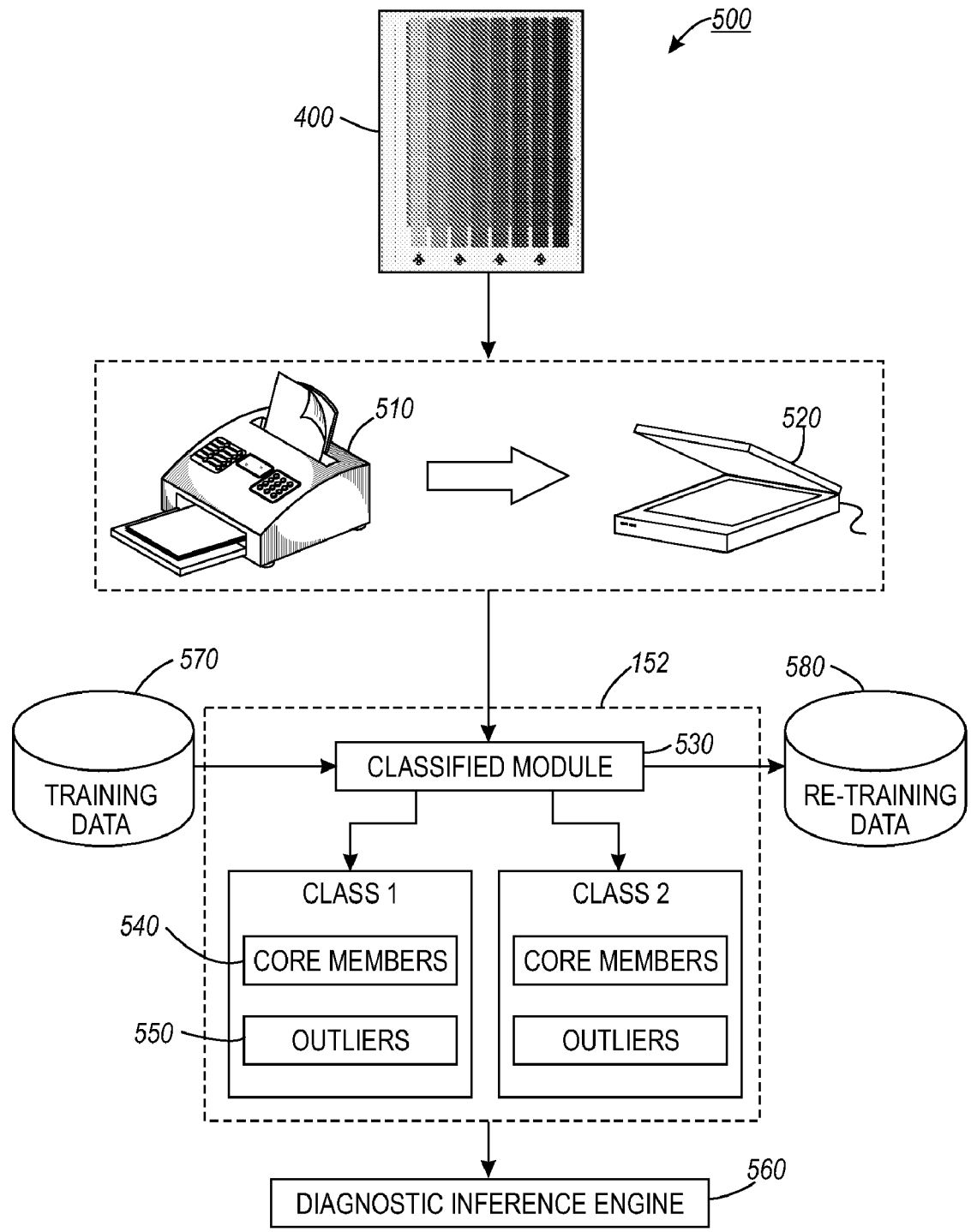
FIG. 5 illustrates a block diagram of an automated image quality diagnostic system, in accordance with an embodiment.

The diagnostics can be initiated by the machine or an operator, as depicted at block 305. The machine and job data can be collected and analyzed, as indicated at block 310. The data generally includes commands issued by the system controller(s), sensor readings and job control data. A diagnostic engine 560, as shown in FIG. 5, can then be invoked to obtain an initial diagnosis or state of the machine and jobs, as illustrated at block 315. Thereafter, as depicted at block 320, one or more test items can be provided to the defect recognition module 152. The defect recognition module 152 can be invoked to identify the presence of relevant defects in the test items, as indicated at block 325.

Next, as illustrated at block 330, the diagnostic engine 560 can also be invoked to refine initial diagnosis. The diagnostic engine 560 refines its original diagnosis based on this new information and produces diagnostic results i.e., the final list of failures or suspects, as indicated at block 335. The machine operation can be verified, as depicted at block 340. A determination can be made whether the machine is properly functioning, as illustrated at block 345. If the machine is properly functioning, the diagnostics are exited, as depicted at block 350. Otherwise, a repair action can be performed, as depicted at block 355.

Referring to FIG. 5, a block diagram of an automated image quality diagnostic system 500 is illustrated, in accordance with an embodiment. Note that in FIGS. 1-7, identical or similar parts are generally indicated by identical reference numerals. The automated image quality diagnostic system 500 can be utilized for the automated diagnosis of marking engine failures based on image quality defect analysis. The system 500 can be utilized for the automatic identification of image quality defects via image processing techniques and pattern recognition algorithms and the automatic diagnosis of the machine failures, based on the output of the above analysis and relevant machine information, via the diagnostic inference engine 560.

The service engineers, or in certain cases, the customers themselves, may restore the machine to a normal working condition with minimal downtime. The automated image quality diagnostics system 500 can be operated when an operator is not satisfied with the machine performance, or when preventive maintenance is desired. The image quality analysis may be utilized as part of a system for machine diagnostics. For example, images from a printer 510 may be scanned by a scanner 520 associated with the printer 510 and fed into the defect recognition module 152, which then quantifies different types of image quality defects and utilize this as a basis for diagnosing machine problems.

The diagnostics system 500 generally includes a classifier 530 that can assign a label or a symptom to images that are fed to the system 500 and also provides output to the diagnostic engine 560. Note that as utilized herein, the term classifier generally refers to systems and/or modules that process a data set and categorizes the data set based upon prior examples of similar data sets such as, for example, training data 570. In general, the classifier 530 may be trained on a number of training data sets with known categorizations and then utilized to categorize new data sets. The images with known faults (e.g., banding, streaks, spots, etc.) can be utilized to train the classifier 530. The training data 570 can be modeled based on a number of existing known faults.

Note that the classifier 530 may be, for example a support vector machine (SVM). The support vector method is a technique which is designed for efficient multidimensional function approximation. The support vector machines determine the classifier or regression machine, which minimizes the empirical risk (i.e., the training set error) and the confidence interval (which corresponds to the generalization or test set error), that is, to fix the empirical risk associated with an architecture and then to utilize a method to minimize the generalization error. The classifier 530 can be trained in association with the training data 570 (e.g., historical data) in order to reflect salient attributes and behaviors of the phenomena being classified. The set of training data 570 can be provided as inputs to the classifier 530 during the training process.

Figure 4:
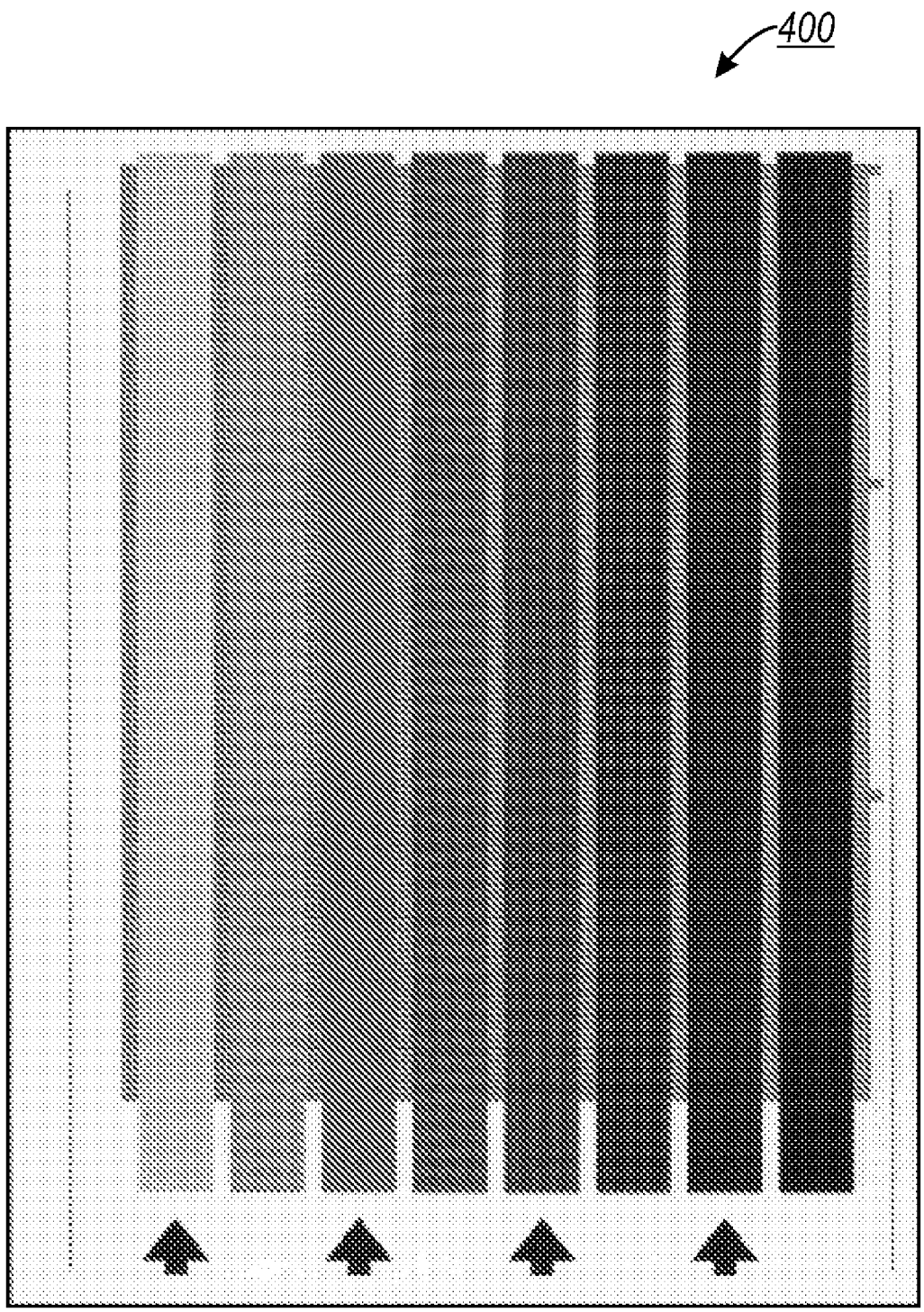
FIG. 4 illustrates a perspective view of a test pattern for image defect classification, in accordance with an embodiment.

The classifier 530 may receive real-world data as inputs and provide predictive output information which can be utilized to control the process or system or make decisions regarding the classified phenomena. A known test pattern 400, as depicted in FIG. 4, can be fed to the classifier 530. The test pattern 400 can be printed and scanned via the printer 510 and the scanner 520 in order to extract a raw image, which in turn can be fed to the classifier 530. The classifier 530 labels a raw data obtained from the raw image and creates various classes such as, for example, class 1 and class 2, based on the training data 570. Such automatic classification of objects utilizing the classifier 530 provides significant improvement in identifying and tracking the machine defects. The defects can be analyzed as a class and steps can be taken to correct the cause of the defect, thereby enhancing the machine performance and competitiveness, and improving process yields.

The classifier 530 functions as a universal approximator to mimic any bounded continuous function with arbitrary precision and provides a soft measure of membership in the class (e.g., class 1 and class 2). The members of each class can be clustered into two groups such as, core members 540 and outliers 550. The classifier 530 ensures good classification in a wide variety of scenarios and is useful for determining the level of confidence in the output of the classifier 530. Note that the points most unlikely to belong to the class can be termed as outliers 550 while the rest can be considered as the core members 540 of the class. For example, an SVM classifier can be utilized to separate prints with 2 mm banding from prints with a 3 mm streak. Additionally, the soft measure can be utilized to cluster the banding prints into two groups: one associated with high confidence in the 2 mm banding label and the other is not sure.

The system 500 performs a statistical measurement (e.g., a Kullback-Liebler divergence) to decide if the distribution of the outliers 550 is sufficiently different than that of the core members 540 after enough outliers 550 have been accumulated. In general, the Kullback-Liebler divergence is a non-commutative measure of the difference between two probability distributions. Such statistical measurement via utilization of the Kullback-Liebler divergence quantifies the change in distribution when a set of spurious features gets large enough. If the distribution of the outliers 550 is different than that of the core members 540, the classifier 530 can be re-trained via a re-training data 580. Otherwise, the output of the classifier 530 can be fed to the diagnostic engine 560. Note that the embodiments discussed herein generally relate to an image quality diagnostic system. It can be appreciated, however, that such embodiments can be implemented in the context of other diagnostic systems or classifier modules to determine the optimal re-training and are not limited to an image quality diagnostic system. The discussion of image quality diagnostic system, as utilized herein, is presented for general illustrative purposes only.

Figure 6:
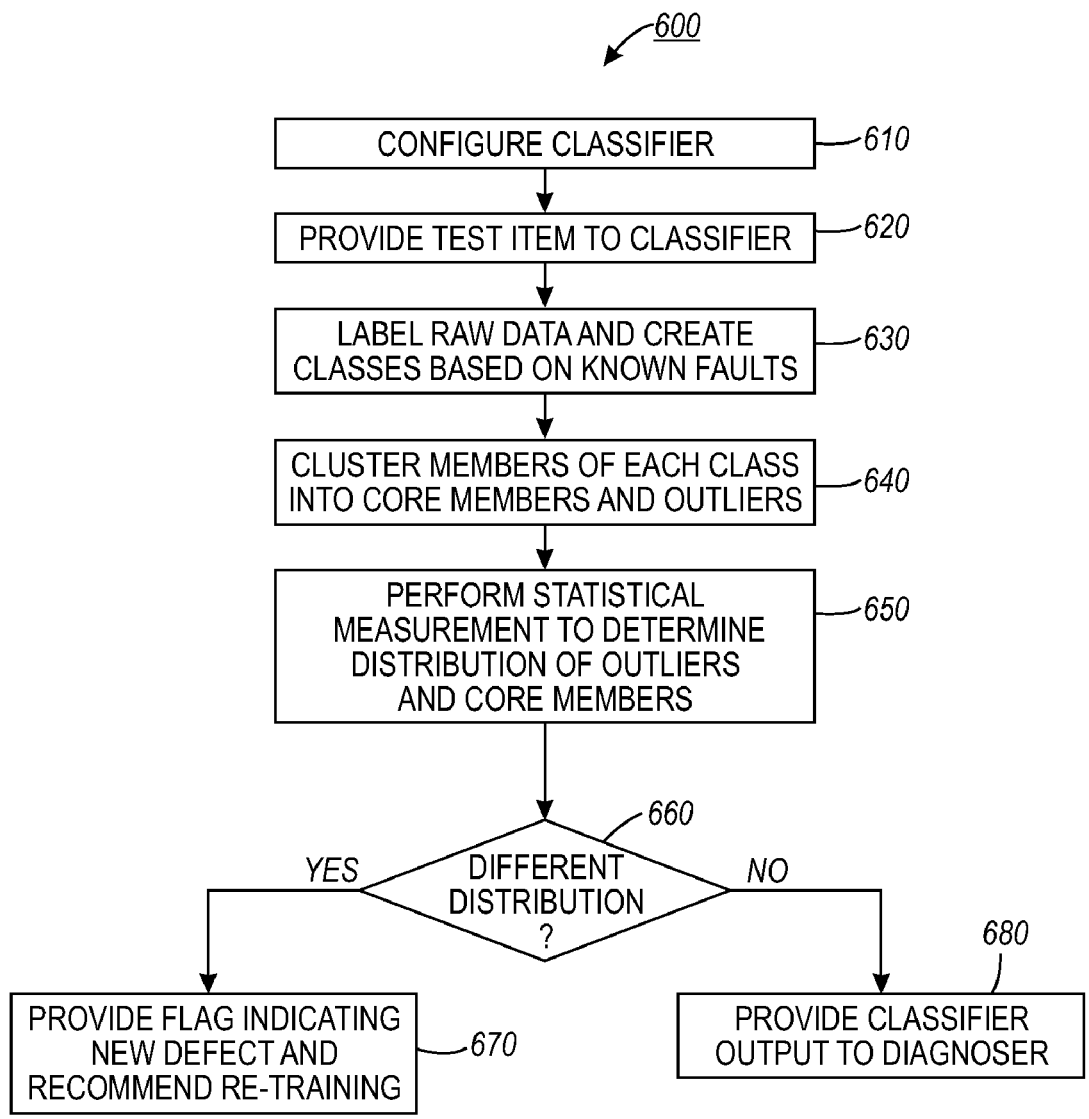
FIG. 6 illustrates a high level flow chart of operations illustrating logical operational steps of a method for automatically determining an optimal re-training interval for a diagnoser, in accordance with an embodiment.

FIG. 6 illustrates a high level flow chart of operations illustrating logical operational steps of a method 600 for automatically determining an optimal re-training interval for the diagnostic inference engine 560, in accordance with an embodiment. Note that the method 600 can be implemented in the context of a computer-usable medium that contains a program product. The method 600 depicted in FIG. 6 can also be implemented in a computer-usable medium containing a program product.

The classifier 530 can be configured, as depicted at block 610. Thereafter, as indicated at block 620, a test item such as, for example, the test pattern 400 can be provided to the classifier 530. Thereafter, the raw data associated with the test item can be labeled and the classes can be created based on known faults, as depicted at block 630. The members of each class can be clustered into the core members 540 and the outliers 550, as illustrated at block 640. Thereafter, the statistical measurement can be performed to determine the distribution of the core members 540 and the outliers 550, as indicated at block 650. Next, as depicted at block 660, a determination can be made as to whether the distribution of the outliers 550 is significantly different from the core members 540. If the distribution of the outliers 550 is different, a flag can be set indicating a new defect and then re-training can be recommended, as illustrated at block 670. Otherwise, the output of the classifier 530 can be provided to the diagnostic inference engine 560, as depicted at block 680.

Figure 7:
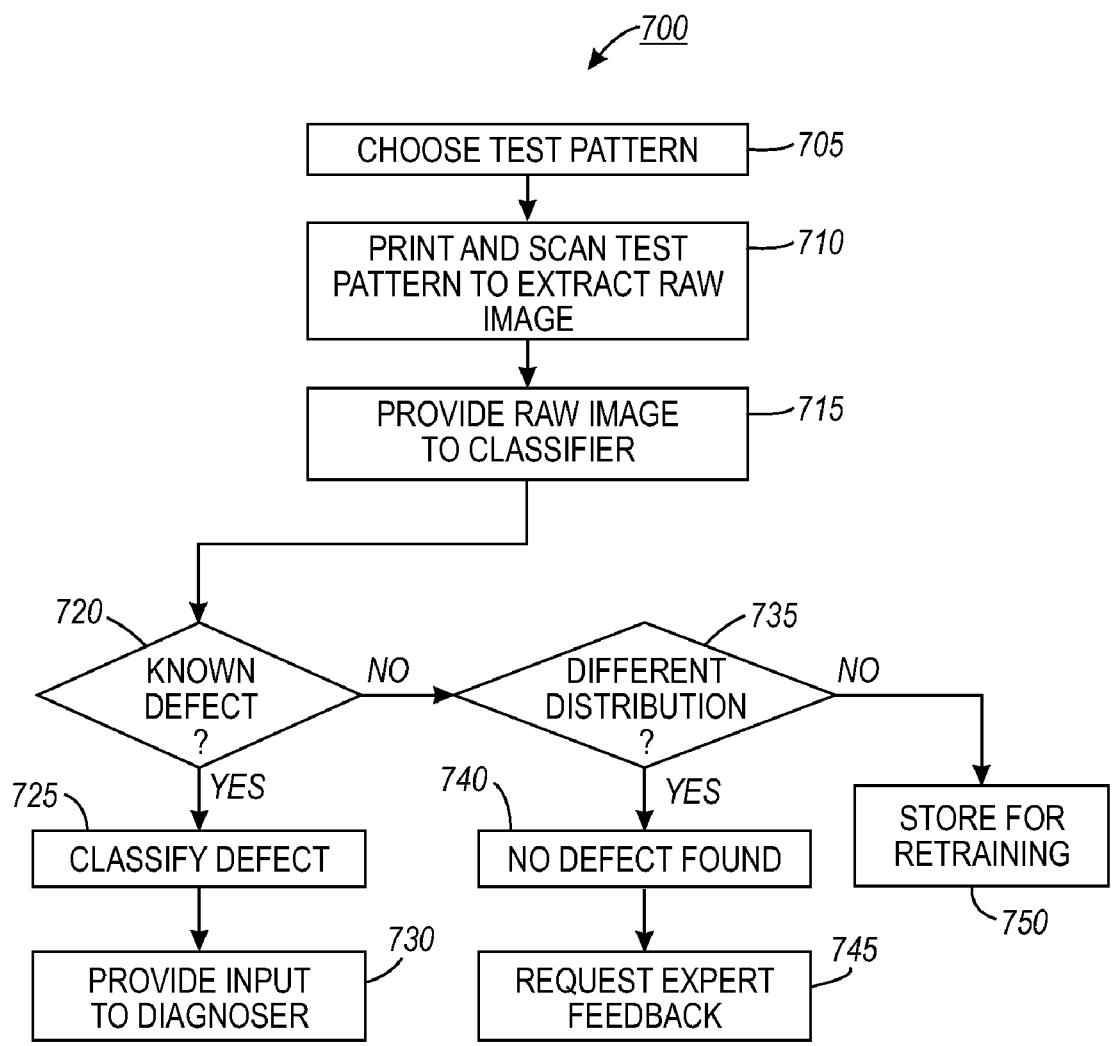
FIG. 7 illustrates a high level flow chart of operations illustrating logical operational steps of a method for automatically diagnosing new rendering device faults based on image quality defect analysis, in accordance with an embodiment.

FIG. 7 illustrates a high level flow chart of operations illustrating logical operational steps of a method 700 for automatically diagnosing new rendering device faults based on image quality defect analysis, in accordance with an embodiment. The test pattern 400 can be chosen, as depicted at block 705. The test pattern 400 can then be printed and scanned to extract the raw image, as indicated at block 710. If the printer 510 has defects that cause image quality artifacts, then the defects can be manifested in the raw image. The raw image can then be fed to the classifier 530, as illustrated at block 715.

Thereafter, a determination can be made whether the defect is known to the classifier 530, as depicted at block 720. If the defect is known to the classifier 530, then the defect can be classified as indicated at block 725 and thereafter appropriate input can be provided to the diagnoser 560, as depicted at block 730. Otherwise, a test may be performed, as indicated at block 735 to determine if the distribution of the outliers 550 is significantly different than that of the core members 540. Assuming that the distribution of outliers 550 is different, a flag may be set to indicate that no defect has been found, as indicated at block 740. Thereafter, expert feedback may be requested, as illustrated at block 745. Otherwise, the data can be stored for re-training purpose, as depicted at block 750.

Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), system memory such as, but not limited to, Random Access Memory (RAM), and communication media such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent. Thus, the methods 600 and 700 described herein can be deployed as process software in the context of a computer system or data-processing system as that depicted in FIGS. 1-2.

The methods 600 and 700 develop a formal mechanism that can automatically determine when to re-train the fault diagnoser 560 and enable the classifier 530 to handle the new defects which can emerge over time. The algorithmic components of such mechanism can be detected in a system by synthesizing the training data 570 that yields known classification results. Similarly, the training data 570 from synthetic new classes can be generated in order to provide identifiable results. The proposed approach provides a preventive maintenance that can reduce the occurrence of machine breakdown in manufacturing companies and the chance of degradation of image quality of final outputs can be minimized.

While the present invention has been particularly shown and described with reference to one or more embodiments, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

It will be appreciated that variations of the above-disclosed and other features and functions, or alternatives thereof may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A computer-implemented method for automatically diagnosing new faults in a device, said method comprising:
   said computer generating a measure of membership with respect to each feature vector belonging to at least one known class among a plurality of known classes utilizing a classifier;
   said computer clustering a plurality of members associated with said at least one known class into two clusters including core class members and at least one outlier cluster in order to detect a presence of a new defect and a drift in the probabilistic distribution of the plurality of members between the core class and the at least one outlier cluster in a known defect in the device overtime, wherein the device is a rendering device and the known defect is an image quality defect;
   said computer determining if a probabilistic distribution of said plurality members of said outlier cluster associated with said class quantifies a change in distribution when a set of spurious features becomes sufficiently different from said corresponding distribution of said core class members to therefore indicate said new faults and said drift in said known defect and thereafter diagnose said new faults and said drift in said known defect in said device, wherein said new faults are unknown image quality defects; and
   said computer retraining said classifier with updated characteristics of said new defect.

2. The method of claim 1 further comprising said computer initially mapping a plurality of known faults to user-defined classes to derive said plurality of known classes.

3. The method of claim 1 further comprising said computer configuring said classifier based on training data if said distribution of outliers is different than said core members, wherein said classifier assigns image quality based feature vectors to said at least one known class among said plurality of known classes.

4. A computer-implemented method for automatically diagnosing new faults in a device, said method comprising:
   said computer mapping known faults to user-defined classes to derive a plurality of known classes;
   said computer configuring a classifier based on training data, wherein said classifier assigns image quality based feature vectors to at least one known class among said plurality of known classes;
   said computer generating a measure of membership with respect to each feature vector belonging to said at least one known class utilizing said classifier;
   said computer clustering a plurality of members associated with said at least one known class into two clusters including core class members and at least one outlier cluster in order to detect a presence of a new defect and a drift in the probabilistic distribution of the plurality of members between the core class and the at least one outlier cluster in a known defect in the device overtime, wherein the device is a rendering device and the known defect is an image quality defect; and
   said computer determining if a probabilistic distribution of said plurality members of said outlier cluster associated with said class quantifies a change in distribution when a set of spurious features becomes sufficiently different from said corresponding distribution of said core class members to therefore indicate said new faults and said drift in said known defect and thereafter diagnose said new faults and said drift in said known defect in said device, wherein said new faults are unknown image quality defects; and said computer retraining said classifier with updated characteristics of said new defect.

5. The method of claim 4 further comprising said computer performing a corrective action with respect to said new defect in said device.

6. The method of claim 5 wherein said corrective action comprises said computer re-training said classifier with updated expert identified classes based on a magnitude of a Kullback-Liebler divergence.

7. The method of claim 4 further comprising said computer assigning a label to said new defect based on a plurality of known faults utilizing said classifier.

8. The method of claim 4 further comprising said computer associating a support vector machine classifier with said classifier.

9. The method of claim 4 further comprising:
said computer extracting a raw image from a test pattern; and
said computer transmitting said raw image to said classifier in the event said new defect is identified with respect to an image quality associated with said device.

10. The method of claim 4 further comprising said computer configuring said classifier to generate a flag if said classifier detects statistical evidence for the existence of said new defect.

11. The method of claim 4 further comprising said computer training said classifier with respect to a plurality of images associated with at least one symptom.

12. A system for automatically diagnosing new faults in a device, said system comprising:
a processor;
a data bus coupled to said processor; and
a non-transitory computer-usable medium embodying computer program code, said non-transitory computer-usable medium being coupled to said data bus, said computer program code comprising instructions executable by said processor and configured for:
mapping known faults to user-defined classes to derive a plurality of known classes;
configuring a classifier based on training data, wherein said classifier assigns image quality based feature vectors to at least one known class among said plurality of known classes;
generating a measure of membership with respect to each feature vector belonging to said at least one known class utilizing said classifier;
clustering a plurality of members associated with said at least one known class into two clusters including core class members and at least one outlier cluster in order to detect a presence of a new defect and a drift in the probabilistic distribution of the plurality of members between the core class and the at least one outlier cluster in a known defect in the device overtime, wherein the device is a rendering device and the known defect is an image quality defect; and
determining if a probabilistic distribution of said plurality members of said outlier cluster associated with said class quantifies a change in distribution when a set of spurious features becomes sufficiently different from said corresponding distribution of said core class members to therefore indicate said new faults and said drift in said known defect and thereafter diagnose said new faults and said drift in said known defect in said device, wherein said new faults are unknown image quality defects; and
retraining said classifier with updated characteristics of said new defect.

13. The system of claim 12 wherein said instructions are further configured for performing a corrective action with respect to said new defect in said device.

14. The system of claim 13 wherein said corrective action comprises re-training said classifier with updated expert identified classes based on a magnitude of a Kullback-Liebler divergence.

15. The system of claim 12 wherein said instructions are further configured for assigning a label to said new defect based on a plurality of known faults utilizing said classifier.

16. The system of claim 12 wherein said instructions are further configured for associating a support vector machine classifier with said classifier.

17. The system of claim 12 wherein said instructions are further configured for:
extracting a raw image from a test pattern; and
transmitting said raw image to said classifier in the event said new defect is identified with respect to an image quality associated with said device.

18. The system of claim 12 wherein said instructions are further configured for configuring said classifier to generate a flag if said classifier detects statistical evidence for the existence of said new defect.

19. The system of claim 12 wherein said instructions are further configured for training said classifier with respect to a plurality of images associated with at least one symptom.

20. The system of claim 12 wherein said instructions are further configured for:
assigning a label to said new defect based on a plurality of known faults utilizing said classifier; and
associating a support vector machine classifier with said classifier.

* * * * *